United States Patent
Raffard et al.

(10) Patent No.: US 9,113,338 B2
(45) Date of Patent: Aug. 18, 2015

(54) METHOD OF CONTROLLING APPLICATIONS INSTALLED ON A SECURITY MODULE ASSOCIATED WITH A MOBILE TERMINAL, AND AN ASSOCIATED SECURITY MODULE, MOBILE TERMINAL, AND SERVER

(75) Inventors: Rémi Raffard, Paris (FR); Laurent Fourreau, Evrecy (FR)

(73) Assignee: Orange, Paris (FR)

(*) Notice: Subject to any disclaimer, the term of this patent is extended or adjusted under 35 U.S.C. 154(b) by 677 days.

(21) Appl. No.: 12/745,946

(22) PCT Filed: Dec. 3, 2008

(86) PCT No.: PCT/FR2008/052192
§ 371 (c)(1),
(2), (4) Date: Jun. 3, 2010

(87) PCT Pub. No.: WO2009/077706
PCT Pub. Date: Jun. 25, 2009

(65) Prior Publication Data
US 2010/0275242 A1 Oct. 28, 2010

(30) Foreign Application Priority Data
Dec. 7, 2007 (FR) ...................................... 07 59659

(51) Int. Cl.
*H04L 29/06* (2006.01)
*H04W 12/12* (2009.01)

(52) U.S. Cl.
CPC ............... *H04W 12/12* (2013.01); *H04L 63/10* (2013.01)

(58) Field of Classification Search
CPC ......... H04L 63/10; G06F 21/34; H04W 12/12
USPC ........................................ 726/2, 9, 26; 705/59
See application file for complete search history.

(56) References Cited

U.S. PATENT DOCUMENTS

| | | | |
|---|---|---|---|
| 5,014,234 A | 5/1991 | Edwards, Jr. | |
| 5,386,369 A * | 1/1995 | Christiano | 705/400 |

(Continued)

FOREIGN PATENT DOCUMENTS

| | | | |
|---|---|---|---|
| EP | 1843273 | * | 10/2007 |
| EP | 1 918 840 A2 | | 5/2008 |

(Continued)

OTHER PUBLICATIONS

Pandya; Emerging mobile and personal communication systems; Published in: Communications Magazine, IEEE (Volume:33 , Issue: 6 ); Date of Publication : Jun. 1995; pp: 44-52; IEEE Xplore.*

(Continued)

*Primary Examiner* — Bradley Holder
(74) *Attorney, Agent, or Firm* — Drinker Biddle & Reath LLP

(57) ABSTRACT

The invention relates to a method of controlling applications installed in a security module associated with a mobile terminal and adapted to increment at least one transaction value during a transaction effected by an application and, if that transaction value reaches an associated predetermined value, sending at least one connection command to a management server and blocking at least one application if the command fails. The invention also relates to a method of managing such applications adapted to receive a connection command, verify the user rights and update at least one transaction value and/or block at least one application as a function of the verification result. The invention further relates to a management server, a mobile terminal and a security module that can be used with a mobile terminal.

14 Claims, 3 Drawing Sheets

(56) References Cited

U.S. PATENT DOCUMENTS

| | | | |
|---|---|---|---|
| 5,708,716 A * | 1/1998 | Tisdale et al. | 380/247 |
| 5,748,742 A * | 5/1998 | Tisdale et al. | 380/249 |
| 6,035,039 A * | 3/2000 | Tisdale et al. | 380/249 |
| 7,312,707 B1 * | 12/2007 | Bishop et al. | 340/572.1 |
| 7,320,139 B2 * | 1/2008 | Audebert | 726/5 |
| 8,881,283 B2 * | 11/2014 | Tuvell et al. | 726/24 |
| 2004/0024688 A1 | 2/2004 | Bi et al. | |
| 2004/0214560 A1 | 10/2004 | Date et al. | |
| 2004/0255290 A1 * | 12/2004 | Bates et al. | 717/174 |
| 2006/0268838 A1 * | 11/2006 | Larsson et al. | 370/352 |
| 2007/0061211 A1 * | 3/2007 | Ramer et al. | 705/25 |
| 2007/0244819 A1 * | 10/2007 | Goeke et al. | 705/52 |
| 2008/0086773 A1 * | 4/2008 | Tuvell et al. | 726/23 |
| 2008/0086776 A1 * | 4/2008 | Tuvell et al. | 726/24 |
| 2008/0201493 A1 * | 8/2008 | Richardson et al. | 710/15 |
| 2008/0320607 A1 * | 12/2008 | Richardson | 726/33 |
| 2011/0208965 A1 * | 8/2011 | Machani | 713/168 |

FOREIGN PATENT DOCUMENTS

| | | |
|---|---|---|
| WO | 00/58811 A2 | 10/2000 |
| WO | 2007/076476 A2 | 7/2007 |

OTHER PUBLICATIONS

Brawerman et al.; Towards a fraud-prevention framework for software defined radio mobile devices; Published in: Journal EURASIP Journal on Wireless Communications and Networking archive; vol. 2005 Issue 3, Aug. 1, 2005; pp. 401-412; ACM Digital Library.*

GSMA, "mobile NFC technical guidelines—Version 2.0," GSMA, retrieved from internet website: http://www.gsmworld.com/documents/nfc/gsma_nfc2_wp.pdf, pp. 1-95 (Nov. 2007).

* cited by examiner

METHOD OF CONTROLLING APPLICATIONS INSTALLED ON A SECURITY MODULE ASSOCIATED WITH A MOBILE TERMINAL, AND AN ASSOCIATED SECURITY MODULE, MOBILE TERMINAL, AND SERVER

CROSS-REFERENCE TO RELATED APPLICATIONS

This application is the U.S. national phase of the International Patent Application No. PCT/FR2008/052192 filed Dec. 3, 2008, which claims the benefit of French Application No. 07 59659 filed Dec. 7, 2007, the entire content of which is incorporated herein by reference.

FIELD OF THE INVENTION

The present invention relates to the field of telecommunications and more particularly to the field of the security of applications hosted on a secure element of a mobile terminal.

BACKGROUND

Most existing mobile terminals make it possible not only to set up telephone calls but also to execute a plurality of applications downloaded into a secure module connected to the terminal. This secure module can be a memory module of the terminal or a removable storage medium inserted into the terminal (for example a subscriber smart card).

These applications are downloaded and updated using a standard connection between the mobile terminal and a management server, for example the server of a service provider.

Some of the applications present in the security module may be applications that are known as contactless applications. These applications are executed at the request of an external equipment known as a contactless reader. A dedicated module, called the "contactless module", is installed in the mobile terminal and enables dialogue between the security module and the contactless reader.

Theft or loss of the security module can lead to unlimited fraudulent use of the applications installed in the security module. Similarly, a user who has lost their rights to an application, for example because they missed a payment, may continue to use said application as long as they do not log onto the management server.

The solution whereby the issuer of the security module or the service provider blocks the application that it manages imposes setting up a standard telephone connection between the issuer or the service provider and the mobile terminal into which the security module is inserted. A user intent on fraud is able to prevent such a connection being set up and consequently to prevent such blocking.

Moreover, even if it is possible to set up such a connection, the delay between the time of the theft or loss of the security module and sending the blocking command can be sufficiently long to enable a user intent on fraud to make use of the contactless applications installed on the security module.

Thus there exists a requirement to monitor the use of a security module in order to improve the security of applications installed in a security module that is associated with a mobile terminal.

SUMMARY

To this end, the present invention proposes a method of controlling applications installed in a security module associated with a mobile terminal and adapted to effect with an equipment transactions linked to the applications. According to the invention this method includes the following steps:

incrementing at least one transaction value in a memory of the security module during a transaction effected by an application installed in the security module;

comparing the at least one transaction value with an associated predetermined value;

if at least one transaction value reaches its associated predetermined value, sending at least one connection command to a management server of the application; and blocking at least one application in the event of failure of said at least one command.

Thus the method of the invention makes it possible to limit the number of transactions performed by a security module if the mobile terminal cannot be connected to a management server. It makes it possible to limit the number of operations that a user can effect if they are not authorized to effect them. The method of the invention thus makes using the security module more secure.

According to one feature of the invention, the incrementation step increments a transaction value common to all the applications present in the security module during a transaction carried out by any of the applications.

According to another feature of the invention, used alone or in combination with the preceding feature, the incrementation step increments a transaction value linked to an application present in the security module during a transaction effected by that application.

In one implementation of the invention, the blocking step includes a step of stopping the transaction in progress. Thus the transaction is not effected for as long as the security module cannot be connected to the server.

In another implementation, the blocking step includes a step of sending at least one application an instruction preventing future selection of said at least one application. The user must then contact the service provider or providers linked to the applications to unblock the applications if that is appropriate. Unblocking is then effected only after verification by the service provider of the rights of the user.

In one implementation of the invention, the blocking step is effected after sending a plurality of connection commands. Thus a plurality of fruitless attempts is necessary for blocking to occur. This makes it possible to avoid unintentional blocking.

In one implementation of the invention, if the connection command succeeds, the method further includes a step of reception from the management server of an update to the rights linked to at least one application as a function of the result of a verification of the user rights associated with said at least one application.

The method may further include a step of updating at least one transaction value and/or a step of receiving an instruction preventing future selection of said at least one application.

Thus if the connection command succeeds, the server called by the mobile terminal can update the user rights linked to one or more applications if they have administrator rights in respect of those applications.

The invention also provides a method of managing applications installed in a security module associated with a mobile terminal and adapted to effect transactions linked to the applications, the method including the following steps:

receiving a connection command sent by the mobile terminal following at least one transaction value reaching an associated predetermined value;

verifying the user rights for at least one application installed in the security module; and as a function of the verification result, updating at least one transaction value and/or blocking at least one application.

The invention further provides a security module containing at least one application adapted to effect at least one transaction with an equipment, the method being characterized in that it includes:

means for incrementing at least one transaction value;

means for comparing the at least one transaction value with an associated predetermined value;

means for sending at least one connection command to an application management server if the value of the counter reaches the predetermined value; and means for blocking at least one application if said at least one command fails.

The invention further provides a mobile terminal including a security module as described above.

The invention further provides a management server for at least one application installed in a security module associated with a mobile terminal, the server including:

means for receiving a connection command sent by the mobile terminal following at least one transaction value reaching its associated predetermined value;

means for verifying the user rights for at least one application stored in the security module; and means for sending a command to update at least one transaction value and/or to block at least one application.

The invention finally provides a computer program product comprising instructions for executing the steps of the control method as described above when it is loaded into and executed by a processor of a security module.

BRIEF DESCRIPTION OF THE DRAWINGS

Other features and advantages of the present invention become more clearly apparent in the following description of three implementations of the invention chosen by way of non-limiting example, the description being given with reference to the appended drawings, in which.

DETAILED DESCRIPTION

Figure 1:
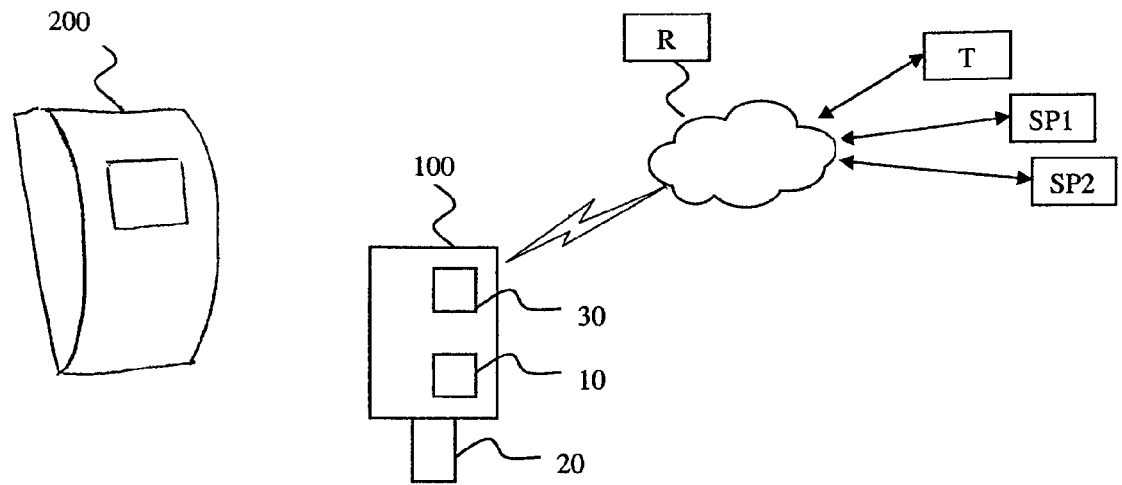
FIG. 1 is a general diagram showing the context of the invention.

Referring to FIG. 1, a user has in their possession a mobile terminal 100 in which a plurality of applications has been installed. This mobile terminal is a mobile telephone or a personal digital assistant (PDA), for example.

This mobile terminal 100 includes a contactless communications module 10 enabling dialogue between the terminal 100 and an equipment 200 referred to below as a contactless reader. The contactless module is compatible with near field communication (NFC), for example.

The mobile terminal also includes a communications module 30, for example a GSM module, enabling communication via a communications network R with remote servers, for example a service platform T or servers SP1, SP2 of a service provider. This communication is for example over-the-air (OTA) communication, i.e. standard wireless communication. Alternatively, the mobile terminal is connected to the network R by a cable telephone line.

The mobile terminal 100 further includes a secure module 20 that is a removable memory card compatible with the Global Platform Card Specification, version 2.1.1, March 2006.

Alternatively, this module may be a secure memory area of the mobile terminal or a removable storage medium of some other type (for example a SIM (Subscriber Identity Module) card, a UICC (Universal Integrated Circuit Card) or a memory card hosting a secure element (SD card, embedded secure controller, etc.)).

Figure 2:
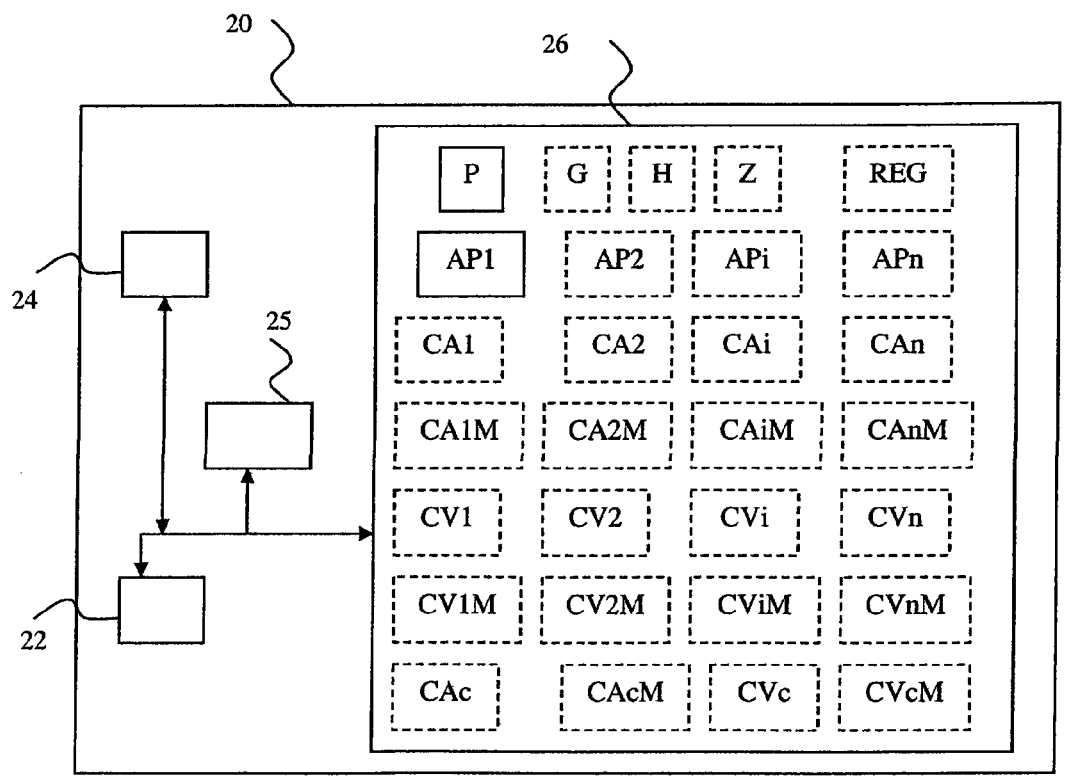
FIG. 2 is a block diagram representing a security module of the invention.

Referring to FIG. 2, the security module includes a microprocessor 22, a send-receive module 24, one or more random-access memories (RAM) 25, and one or more read-only memories (ROM or EEPROM) 26 in which are stored programs that can be executed by the microprocessor 22. These programs include a main program P that is the card operating system (OS) and one or more applications (AP1, AP2, etc.).

One or more of these applications are contactless applications and use the contactless module 10. One such application controls access to public transport, for example. This application is used each time that the person carrying the mobile terminal seeks to access the public transport system. On each use, a dialogue between the application stored in the security module 20 and a contactless reader 200 installed at the entry to the public transport system enables the reader to verify that the person carrying the mobile terminal is authorized to use the transport system. For example, this dialogue makes it possible to verify that the person carrying the mobile terminal has a valid subscription for this transport system or to decrement a number of tickets stored in the subscriber card. This dialogue between the security module 20 and the contactless reader 200 is effected via the contactless module 10.

In known manner, the contactless reader 200 emits a magnetic field. When the user of the mobile terminal goes to the entry of the transport system, their mobile terminal enters the magnetic field emitted by the reader 200. A transaction is then effected between the selected application present in the security module 20 and the reader 200. To be more precise, when the mobile terminal enters the magnetic field of the contactless reader, the contactless module receives from the contactless reader a selection message MS (Select AID) containing the identifier of an application AP1 and sends it to the security module. On reception of this message MS, the security module commands execution of the selected application AP1. As a function of the selected application, messages (M1, M2, ..., Mn) are then exchanged between the application and the contactless reader.

The exchange of messages between the contactless module and the subscriber card is effected in the standard manner, for example using the Single Wire Protocol (SWP) or the SigIn-SigOut-Connection ($S^2C$) interface.

Figure 3:
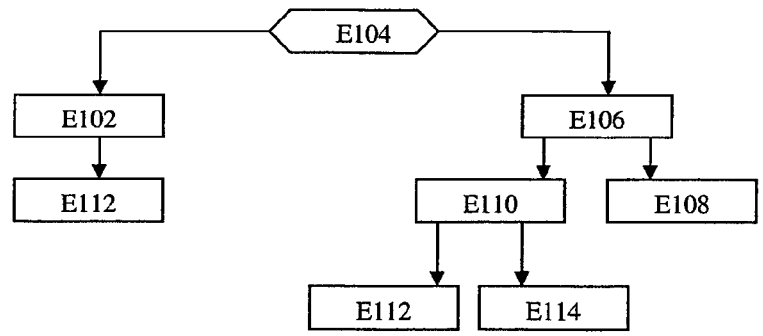
FIG. 3 is a diagram showing the steps of a control and application administration method of a first implementation of the invention.

A first implementation of the invention is described below with reference to FIG. 3.

During a preliminary step (not shown) following installation of the application AP1 in a memory of the security module and before selection of the application a transaction value CA1 (see FIG. 2) associated with the application AP1 is initialized, for example to the value 0, via the security module 20 and stored in a memory 26 of the security module.

On reception of a selection message, the application AP1 of the security module 20, during a step E104, compares the value CA1 with an associated predetermined value CA1M (see FIG. 2) stored in a memory 26 of the security module.

The predetermined value CA1M is for example stored in the memory 26 of the security module during a step of configuring the security module.

If the value CA1 is less than the value CA1M, the application AP1 of the security module 20 increments the value CA1 by an increment of 1 during a step E102. The transaction then continues in the standard way (step E112).

Alternatively, the increment during the step E102 may be a value greater than 1. For example, if the application AP1 is a payment application, the increment is 1 for transactions of low amount (for example less than 20 Euros), 2 for transactions of moderate amount (for example from 20 to 100 Euros), and 3 for transactions of high amount (for example greater than 100 Euros). Thus the value CA1 increases faster if the transactions are of high amount and reaches the associated predetermined value CA1M more quickly.

If during the comparison step E104 the value CA1 is greater than or equal to the value CA1M, the application AP1 sends a management server of the application AP1, for example the server SP1 of the service provider linked to the application AP1, a connection request via the communications module 30 of the mobile terminal and the network R during a step E106. This request is, for example, an SMS instruction MO, as specified in the ETSI TS 102.223 standard, containing a request for verification of the status of the application AP1. In this situation, the application AP1 sends this instruction using the Application Interface SIM Toolkit (API STK) specified in the ETSI TS 10.267 standard. Alternatively, the connection request is a BIP CAT-TP connection request specified in the ETSI TS 102.127 standard.

If this connection request cannot be met, for example because the management server is unavailable, because of intentional or unintentional failure of the communications module 30 of the mobile terminal or for any other reason, the application AP1 is notified. This notification includes an error code, for example, an error code sent by the communications module 30 indicating that it has not received a response, for example. In this situation, the application AP1 does not continue the transaction. The transaction is stopped following lack of response to the selection message (step E108).

If the connection request is met, the management server of the application verifies the rights of the user concerning the application AP1 and during a step E110 the application AP1 receives via the communications module 30 and the network R a response from the server, for example one or more SMS (Short Message System) messages.

If the user still has rights to this application, the response contains an instruction to reinitialize the value CA1, for example to reset this value to 0. The transaction then continues in the standard fashion (step E112).

In contrast, if the user no longer has such rights, for example because they have not renewed their payment for the service or they have informed the application management server of the theft or loss of the security module, the response message contains that information, for example a state bit or byte including a predetermined value. The transaction does not continue (step E114). In this situation, the management server can also send a standard instruction to block the application, for example a Set Status instruction defined in the GlobalPlatform specifications (GlobalPlatform Card Specification, version 2.1.1, March 2006), of effect that is to prevent future selection of the application AP1.

In the implementation described, the steps E102 to E114 are executed by the application AP1. Alternatively, these steps may be performed by an application G (see FIG. 2) installed in the security module 20 and called by the application AP1.

Figure 4:
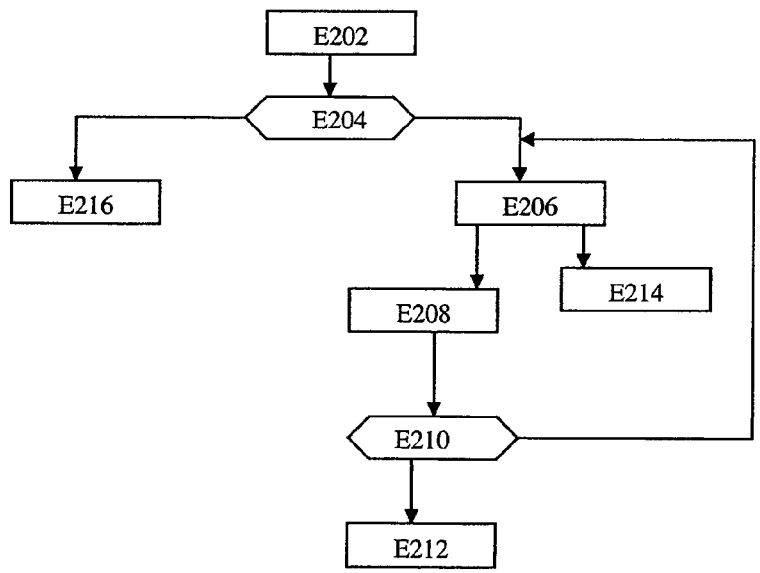
FIG. 4 is a diagram showing the steps of a control and application administration method of a second implementation of the invention.

A second implementation is described below with reference to FIG. 4.

In this second implementation, during a preliminary step (not shown), a transaction value CAc and a connection attempt value CVc in the memory 26 of the security module are initialized to the value 0 by the security module.

In this implementation, the transaction value CAc and the connection attempt value CVc are common to all the applications installed in the security module.

After or during execution of an application AP1 by the security module 20, the application AP1 increments the value CAc by an increment of 1 during a step E202. Then, at the end of the transaction, the application AP1 commands execution of an application Z (see FIG. 2) installed in the security module 20.

Alternatively, the value CAc is incremented by the application Z.

A further alternative is for the application Z to be triggered by the mobile terminal following execution of a transaction.

During the next step E204, the application Z compares the value CAc with an associated predetermined value CAcM stored in a memory 26 of the security module 20.

If the value CAc is less than the value CAcM, the transaction is terminated and the security module awaits a new transaction (returning to the main application P) (step E216).

If the value CAc is greater than or equal to the value CAcM, the application Z of the security module sends a management server T a connection request during a step E206 via the communications module 30 of the mobile terminal and the network R. This request is, for example, an SMS message that contains a request for verification of the status of the applications installed in the security module.

If this connection request cannot be met, for example because the management server is unavailable or because of intentional or unintentional failure of the communications module 30 of the mobile terminal or for any other reason, the security module 20 receives no response or a response message including an error code.

In this situation, the security module increments the connection attempts value CVc during a step E208.

It then compares the value CVc to an associated predetermined value CVcM during a step E210.

CVc is the number of connection attempts effected by the security module and CVcM is the maximum number of attempts that may be made.

If the value CVc is less than the value CVcM, the connection request is repeated after a predetermined delay.

If the value CVc is greater than or equal to the value CVcM, the maximum number of connection attempts has been reached and, during a step E212, the security module blocks the applications that it contains by sending each of them a blocking instruction (for example, a Set Status command). Accordingly, on subsequent reception of a selection message, the selected application sends back an error message indicating that it cannot be selected.

If the connection request succeeds, the management server verifies during a step E214 the rights of the user concerning the applications installed in the security module. This verification is effected by the server T if it has all the information and/or the management server T contacts one or more servers (SP1, SP2, etc.) of the service providers associated with the applications. Following this verification, the security module receives a response from the server, for example in the form of one or more SMS (Short Message System) messages.

For security reasons, exchanges between the security module and a remote server are encrypted by keys shared by the security module and the server.

If the user still has the rights for these applications, the response contains an instruction to reinitialize the values CAc and CVc, for example to reset these values to 0.

In contrast, if the user no longer has the rights to one or more applications, for example, because they have not renewed their payment for the service or the user has informed the management server of the theft or loss of the security module, the response message contains that information, for example in the form of a bit or a byte. In this situation, the management server may equally send a standard instruction to block the applications concerned; this instruction has the effect of preventing future selection of those applications.

The step E202 must be carried out during or after a transaction. In contrast, the steps E204 to E216 can be carried out independently of a transaction. Accordingly, these steps can be executed while powering up the security module, for example.

Figure 5:
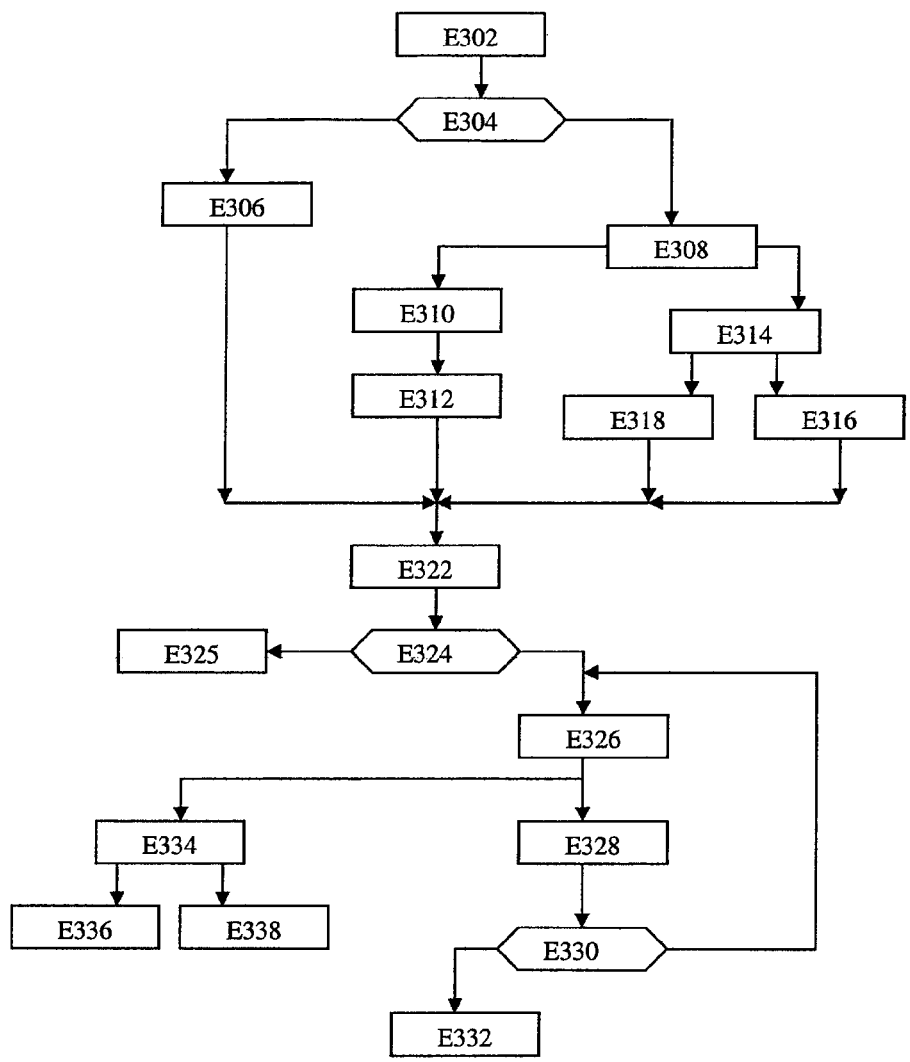
FIG. 5 is a diagram showing the steps of a control and application administration method of a third implementation of the invention.

A third implementation of the invention is described below with reference to FIG. 5.

In this third implementation, during a preliminary step (not shown) following installation of the application AP1 in a memory of the security module and before selection of the application, a transaction value CA1 associated with the application AP1 and stored in a memory 26 of the security module 20 is initialized to the value 0 by the security module. Moreover, a transaction value CAc and a value CVc are initialized to the value 0 by the security module and stored in the memory 26 of the security module. The value CA1 is a transaction value linked to the application AP1. The value CAc is a transaction value linked to all the applications installed in the security module. The value CVc is a number of connection attempts and is associated with all the applications installed in the security module.

On reception of a selection message, the application AP1 of the security module 20 increments the value CA1 by an increment of 1 during a step E302.

During a subsequent step E304, the application AP1 compares the value CA1 with a predetermined value CA1M stored in a memory of the security module.

If the value CA1 is less than the value CA1M, the transaction continues (step E306).

In contrast, if the value CA1 is greater than or equal to the value CA1M, the application AP1 sends a management server T a connection request during a step E308 via the communications module 30 of the mobile terminal and the network R. This connection request is for example an SMS message containing a request for verification of the status of the application AP1.

If this request cannot be met, for example because the management server is unavailable, because of intentional or unintentional failure of the communications module of the mobile terminal or for any other reason, the application AP1 receives either no response or an unavailability message containing an error code. In this situation, the application AP1 does not continue the transaction. The transaction stops following lack of response to the selection message (step E310).

Moreover, during a step E312, the application AP1 commands the updating of a memory REG (see FIG. 2) of the security module. For example, this memory consists of one or more bytes in which one bit is reserved for each installed application. This bit is initialized to a value, for example 0, on installation of the application and is set to another value, for example 1, when the application has failed to be connected to the management server T.

If the connection request succeeds, the management server T verifies the rights of the user in respect of the application AP1 during a step E314, for example by contacting the management server SP1 of the application AP1, and the application AP1 receives a response from the server, for example in the form of one or more SMS (Short Message System) messages.

If the user still has rights for this application, the response contains an instruction to reinitialize the value CA1, for example to reset this value to 0, and an instruction to update the register REG. The transaction then continues in the standard fashion (step E316).

In contrast, if the user no longer has these rights, for example because they have not renewed their payment to the service or the user has informed the application management server of the theft or loss of the security module, the response message contains that information, for example in the form of one or more bytes, and the transaction does not continue (step E318). In this situation, the management server can equally send a conventional application blocking instruction that has the effect of preventing future selection of the application AP1.

Following the step E306, E312, E316 or E318, the application AP1 commands the launching of an application H (see FIG. 2) installed in the security module 20.

During a step E322 the application H increments the transaction value CAc by an increment of 1. During the next step E324 the application H compares the value CAc with a predetermined value CAcM associated with the value CAc and stored in a memory 26 of the security module.

If the value CAc is less than the value CAcM, the security module waits for a new transaction (it returns to the main application P) (step E325).

If the value CAc is greater than or equal to the value CAcM, the application H sends a management server a connection request during a step E326 via the communications module 30 of the mobile terminal and the network R. This request is, for example, an SMS message containing a request for verification of all the applications.

If this request cannot be met, for example because the management server is unavailable or because of intentional or unintentional failure of the communications module 30 of the mobile terminal or for any other reason, the security module 20 receives no response or an unavailability message containing an error code. In this situation, the security module increments the connection attempts value CVc during a step E328 and compares that value with an associated predetermined value CVcM during a step E330.

If the value CVc is less than the value CVcM, the connection request is repeated after a predetermined time-delay.

If the value CVc is greater than or equal to the value CVcM, the maximum number of attempts has been reached and the security module blocks the applications that it contains by sending each of them a blocking instruction (for example a Set Status command) during a step E332. Thus on subsequent reception of a selection message an application sends back an error message indicating that it cannot be selected.

Alternatively, the blocking instruction is an instruction to erase the application from the memory of the security module, for example a Delete instruction defined by the Global Platform specifications.

If the connection request is met, the management server verifies the rights of the user in respect of the various applications installed in the security module during a step E334. It accesses the content of the memory REG to determine the applications that triggered the call and to compare that content with a value stored in a memory of the management server. It then sends a response to the security module, for example in the form of one or more SMS (Short Message System) messages. This response may contain a request to update the memory REG.

If the user still has rights for these applications (step E336), the response is an instruction to reinitialize the values CAc and CVc, for example to reset these values to 0. The reinitialisation instruction may contain an update for the memory REG.

In contrast, if the user no longer has the rights to one or more applications, for example because they have not renewed their payment for one or more services or if they have informed the management server of the theft or loss of the security module, the management server sends the security module during a step E338 instructions to reinitialize the values CA1, CAc, CVc, and REG and a standard instruction to block the applications concerned; this instruction has the effect of preventing future selection of those applications. To be more precise, the server sends an SMS message for each application to be blocked and an SMS message containing an instruction to write the values CA1, CAc, CVc, and REG in the memory 26 of the security module.

It must be remembered that, for security reasons, writing or reading a memory area of a security module of a server requires the use of cryptographic keys shared by the security module and the server.

The values CA1M, CAcM, and CVcM are predetermined values stored in a memory 26 of the security module during an initialization phase. They may be modified by an approved management server. For security reasons, this modification is effected by exchanging messages encrypted using keys shared by the management server and the security module.

A method has been described with a single application AP1. In the situation where a plurality of applications AP1, AP2, ..., APn is installed in the security module, a transaction value CAi linked to the application APi and an associated predetermined value CAiM are stored for each application APi and a single transaction value CAc, an associated single maximum transaction value, a single connection attempts value CVc, and a single maximum attempts value CVcM are stored for all the applications.

In another implementation of the invention, a connection attempts value CVi and an associated maximum connection attempts value CViM are also defined for each application APi. The security module then proceeds to block the application APi when the number of connection attempts CVi reaches the maximum number CViM.

A management server in possession of the keys can access the security module at any time and update the transaction values linked to the applications CA1 to CAn, the common transaction value CAc, and the connection attempts value CVc linked to all the applications and the register REG.

The invention is described above for contactless applications. It may equally be applied if any or all of the applications installed in the security module are applications that require contact.

The invention claimed is:

1. A method of controlling applications installed in a security module of a mobile terminal and configured to conduct with an equipment transactions linked to the applications, the method comprising the following steps:
    incrementing by the mobile terminal at least one transaction value in a memory of the security module during a transaction conducted by one of the applications;
    comparing by the mobile terminal the at least one transaction value with a predetermined value;
    if the at least one transaction value reaches the predetermined value, sending at least one connection command from the security module to a management server of the application via the mobile terminal;
    blocking at least one of the applications in the event of failure of said at least one connection command;
    if a connection responsive to the connection command succeeds and a user has rights concerning the application, receiving by the mobile terminal from the management server an instruction to reinitialize the at least one transaction value, and reinitializing the at least one transaction value; and
    where writing or reading a memory area of the security module requires using cryptographic keys shared by the security module and the management server.

2. The method according to claim 1, wherein an incrementing step increments a transaction value common to all the applications present in the security module during a transaction carried out by any of the applications.

3. The method according to claim 1, wherein an incrementing step increments a transaction value linked to an application present in the security module during a transaction conducted by that application.

4. The method according to claim 1, wherein the blocking step comprises a step of stopping the transaction in progress.

5. The method according to claim 1, wherein the blocking step comprises a step of sending the at least one application an instruction preventing future selection of said at least one application.

6. The method according to claim 1, wherein the blocking step is conducted after sending a plurality of connection commands.

7. The method according to claim 1, further comprising, if the connection command succeeds, receiving from the management server an update to the rights concerning at least one of the applications that has updatable rights as a function of the result of a verification of the user rights concerning said at least one application that has updatable rights.

8. The method according to claim 7, further comprising a step of updating at least one transaction value.

9. The method according to claim 7 further comprising a step of receiving an instruction preventing future selection of said at least one application.

10. The method according to claim 1, further comprising:
    receiving by the management server the connection command sent from the security module by the mobile terminal; and
    verifying by the management server user rights for at least one of the applications installed in the security module.

11. A security module containing one or more applications configured to conduct at least one transaction with an equipment, the security module comprising:
    a hardware processor and memory that comprises program elements, the program elements comprising:
    an incrementing program element that increments at least one transaction value;
    a comparing program element that compares the at least one transaction value with a predetermined value;
    a transmitting program element that sends at least one connection command to an application management server if the value of a counter reaches the predetermined value;
    a blocking program element that blocks at least one application of the one or more applications if said at least one connection command fails;

a receiving program element that receives from the management server, if the connection succeeds and a user has rights concerning the at least one application, an instruction to reinitialize the at least one transaction value; and a reinitializing program element that when the instruction to reinitialize is received, reinitializes the at least one transaction value;

where writing or reading a memory area of the security module requires using cryptographic keys shared by the security module and the management server.

12. A mobile terminal comprising a security module containing one or more applications configured to conduct at least one transaction with an equipment, the security module comprising:

a hardware processor and memory that comprises program elements, the program elements comprising:

an incrementing program element that increments at least one transaction value;

a comparing program element that compares the at least one transaction value with a predetermined value;

a transmitting program element that sends at least one connection command to an application management server if the value of a counter reaches the predetermined value;

a blocking program element that blocks at least one application of the one or more applications if said at least one connection command fails;

a receiving program element that receives from the management server, if the connection succeeds and a user has rights concerning the at least one application, an instruction to reinitialize the at least one transaction value; and an reinitializing program element that when the instruction to reinitialize is received, reinitializes the at least one transaction value;

where writing or reading a memory area of the security module requires using cryptographic keys shared by the security module and the management server.

13. The mobile terminal according to claim 12, in combination with said application management server, the management server comprising:

a hardware processor and memory that comprises program elements, the program elements comprising:

a receiver program element that receives the connection command sent by the mobile terminal;

a verifier program element that verifies user rights for at least one application stored in the security module to which the connection command relates;

a transmitting program element that sends at least one of a command to reinitialize the at least one transaction value and a command to block at least one application of the one or more applications; and cryptographic keys that are shared with the security module and utilized for writing or reading a memory area of the security module.

14. A computer program product embodied on a non-transitory medium, comprising instructions for executing the following steps when it is loaded into and executed by a processor of a security module of a mobile terminal:

incrementing at least one transaction value in a memory of the security module during a transaction conducted by an application of one or more applications installed in the security module with an equipment;

comparing the at least one transaction value with a predetermined value;

if the at least one transaction value reaches the predetermined value, sending at least one connection command from the security module to a management server of the application via the mobile terminal;

blocking at least one application of said one or more applications in the event of failure of said at least one connection command;

if a connection responsive to the connection command succeeds and a user has rights concerning the application, receiving from the management server an instruction to reinitialize the at least one transaction value and reinitializing the at least one transaction value;

when writing or reading a memory area of the security module, using cryptographic keys shared by the security module and the management server.

* * * * *